(12) United States Patent
Manabe et al.

(10) Patent No.: US 6,314,244 B1
(45) Date of Patent: Nov. 6, 2001

(54) CAMERA WITH RETRACTABLE FLASH ASSEMBLY

(75) Inventors: Mitsuo Manabe; Kazuaki Nagata; Hideo Kobayashi; Kenji Yamane, all of Omiya (JP)

(73) Assignee: Fuji Photo Film Co., Ltd., Saitama (JP)

( * ) Notice: Subject to any disclaimer, the term of this patent is extended or adjusted under 35 U.S.C. 154(b) by 0 days.

(21) Appl. No.: 09/524,558

(22) Filed: Mar. 13, 2000

(30) Foreign Application Priority Data

Mar. 16, 1999 (JP) .................................................. 11-070203
Aug. 23, 1999 (JP) .................................................. 11-235678

(51) Int. Cl.$^7$ ............................ G03B 15/06; G03B 15/03
(52) U.S. Cl. ............................................. 396/175; 396/177
(58) Field of Search ................................... 396/175, 176, 396/177, 178

(56) References Cited

U.S. PATENT DOCUMENTS

5,055,866 * 10/1991 Takebayashi ........................ 396/175
5,280,316 * 1/1994 Fukahori et al. .................... 396/177
5,659,818 * 8/1997 Kaihara et al. ...................... 396/158

FOREIGN PATENT DOCUMENTS

10-104696   4/1998 (JP) .

* cited by examiner

Primary Examiner—David M. Gray
Assistant Examiner—Rochelle Blackman
(74) Attorney, Agent, or Firm—Young & Thompson

(57) ABSTRACT

A camera with a retractable electronic flash assembly is provided with a cam member having a first cam face for moving the flash assembly and a second cam face for moving a flashtube in the flash assembly. The cam member is moved within a first moving range to move the flash assembly, and the cam member is moved within a second moving range to move the flashtube. Thus, a moving mechanism of the flash assembly and the flashtube can be simplified.

8 Claims, 13 Drawing Sheets

CAMERA WITH RETRACTABLE FLASH ASSEMBLY

BACKGROUND OF THE INVENTION

1. Field of the Invention

This invention relates generally to a camera with an electronic flash assembly. More particularly, this invention relates to a camera with a retractable electronic flash assembly, which is movable to an inactive position and an active position and whose flashtube is movable forward and backward to change an illumination angle.

2. Description of Related Art

Japanese Patent Provisional Publication No. 10-104696 discloses a camera with a retractable electronic flash assembly. The flash assembly is driven in association with a retraction, a projection and a zooming of a taking-lens barrel of the camera. When the taking-lens barrel is retracted, that is when a power supply of the camera is OFF, the flash assembly is stored in an inactive position in a camera body. When the power supply is turned ON and the taking-lens barrel is protruded to an initial position, the flash assembly is moved to an active position over the camera body. In association with the zooming of the taking-lens barrel, a flashtube in the flash assembly is moved forward and backward so that an illumination angle is changed in accordance with a zooming position.

The conventional moving mechanism of the flash assembly and the flashtube comprises a drive cam, a cam following lever, a slide plate, a drive lever, a drive spring and a connecting rod. The drive cam is connected to an output shaft of a drive motor through a gear train. When the drive cam is rotated by a driving force of the drive motor, the cam following lever is moved to follow a cam face of the drive cam. Then, the flash assembly is moved to a predetermined position and the flashtube is moved to a predetermined illumination angle position by actions of the slide plate, the drive lever, the drive spring, the connecting rod and so on, which are connected to the cam following lever. The conventional moving mechanism of the flash assembly and the flashtube is thus complicated.

SUMMARY OF THE INVENTION

It is therefore an object of the present invention to provide a camera with a retractable electronic flash assembly that is movable between an inactive position and an active position and has a flashtube that is movable forward and backward to change an illumination angle, and that is able to move the flash assembly and the flashtube by a simple moving mechanism.

The above object can be accomplished by providing a camera, comprising: a camera body; a flash assembly which is movable between an inactive position where the flash assembly is stored in the camera body and an active position where the flash assembly is protruded from the camera body; a flashtube arranged in the flash assembly movably forward and backward to change an illumination angle; and a flash assembly moving mechanism including a cam member having a first cam face for moving the flash assembly and a second cam face for moving the flashtube, wherein the flash assembly is moved while being guided by the first cam face when the cam member moves within a first moving range, and the flashtube is moved while being guided by the second cam face when the cam member moves within a second moving range beyond the first moving range.

According to the present invention, the camera is provided with the cam member that has the first cam face for moving the flash assembly and the second cam face for moving the flashtube. The flash assembly is moved while being guided by the first cam face when the cam member moves within the first moving range, and the flashtube is moved while being guided by the second cam face when the cam member moves within the second moving range beyond the first moving range. Thus, the flash assembly and the flashtube can be moved by a first and a second moving actions of one cam member, and therefore the flash assembly and the flashtube can be moved by the simple moving mechanism.

The above object can be accomplished by providing a camera, comprising: a camera body; a flash assembly which is movable between an inactive position where the flash assembly is stored in the camera body and an active position where the flash assembly is protruded from the camera body; a flashtube arranged in the flash assembly movably forward and backward to change an illumination angle; a first moving member arranged in the camera body movably in a predetermined direction, the first moving member moving the flash assembly when the first moving member moves within a first moving range; a cam mechanism operatively connecting the first moving member and a second moving member; and the second moving member which moves the flashtube by being moved in association with the first moving member by the cam mechanism when the first moving member moves within a second moving range beyond the first moving range.

According to the present invention, the first moving member for moving the flash assembly and the second moving member for moving the flashtube are connected to each other through the cam mechanism, and the first moving member moves the flash assembly when the first moving member moves within the first moving range, and the second moving member moves the flashtube by being moved in association with the first moving member by the cam mechanism when the first moving member moves within the second moving range beyond the first moving range. The cam mechanism that moves the second moving member in association with the first moving member is thus adopted, and the structure of the moving mechanism is thereby simpler than that of a mechanism that separately moves the first moving member and the second moving member. Moreover, the action timing of the second moving member with respect to the first moving member is set easily since the second moving member is moved in association with the first moving member by the cam mechanism.

The above object can be accomplished by providing a camera, comprising: a camera body; a flash assembly which is movable between an inactive position where the flash assembly is stored in the camera body and an active position where the flash assembly is protruded from the camera body; a flashtube arranged in the flash assembly movably forward and backward to change an illumination angle; a cam member arranged in the camera body movably in a predetermined direction, the cam member having a first cam face for moving the flash assembly and a second cam face for moving the flashtube; a cam moving member which moves the cam member in the predetermined direction; a flash assembly moving member having a first cam follower to contact with the first cam face of the cam member and a force transmitting member to transmit a force to the flash assembly, the flash assembly moving member moving the flash assembly through the force transmitting member when the cam member is moved in a first moving range and the first cam follower is moved in association with the cam member while being guided by the first cam face; and a flashtube moving member having a second cam follower to contact with the second cam face of the cam member, the flashtube moving member operatively connecting with the flashtube, the second cam follower being supported movably forward and backward by a supporting member, the flashtube moving member moving the flashtube when the cam member is moved within a second moving range beyond the first moving range and the second cam follower is moved in association with the cam member while being guided by the second cam face and the supporting member.

According to the present invention, the moving mechanism of the flash assembly and the flashtube comprises the cam member, the cam moving member, the flash assembly moving member and the flashtube moving member to reduce the number of the parts, and thus the structure of the moving mechanism can be simplified. When the power supply of the camera is turned ON, the cam moving member moves by a predetermined amount to move the cam member within the first moving range, the first cam follower of the flash assembly moving member is moved while being guided by the first cam face in association with the cam member, and the force is transmitted to the flash assembly by the force transmitting member of the flash assembly moving member to move the flash assembly from the inactive position to the active position. When the power supply of the camera is turned OFF, the opposite action is performed to move the flash assembly to the inactive position in the camera body.

On the other hand, to change the illumination angle of the flashtube, the cam moving member moves the cam member within the second moving range. The second cam follower of the flashtube moving member is moved while being guided by the second cam face and the supporting member in association with the cam member, and the flashtube operatively connected to the second cam follower is moved forward and backward to change the illumination angle of the flashtube.

According to the present invention, the cam member and the cam moving member are connected to each other through a spring member, which can absorb an external force applied to the cam member. Thus, the external force is not transmitted to the cam moving member so that the moving mechanism can be protected from the external force. Especially in case of a moving mechanism that runs by a motor, the external force would be transmitted to the motor through the cam moving member to damage the motor if the external force were not absorbed. The motor can be protected by the spring member with a simple structure.

According to the present invention, the flash assembly moving member is a magnifying lever, and a movement of the cam member is magnified and the magnified movement is transmitted to the flash assembly. Thus, the moving mechanism can instantly open and close the flash assembly with a small movement of the cam member.

According to the present invention, the flash assembly is forced toward the active position by a forcing device so that the flash assembly can be smoothly positioned at the active position without shaking. When an external force is applied to the flash assembly at the active position into a storing direction, the flash assembly can be stored against the force of the forcing device, which absorbs the external force.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
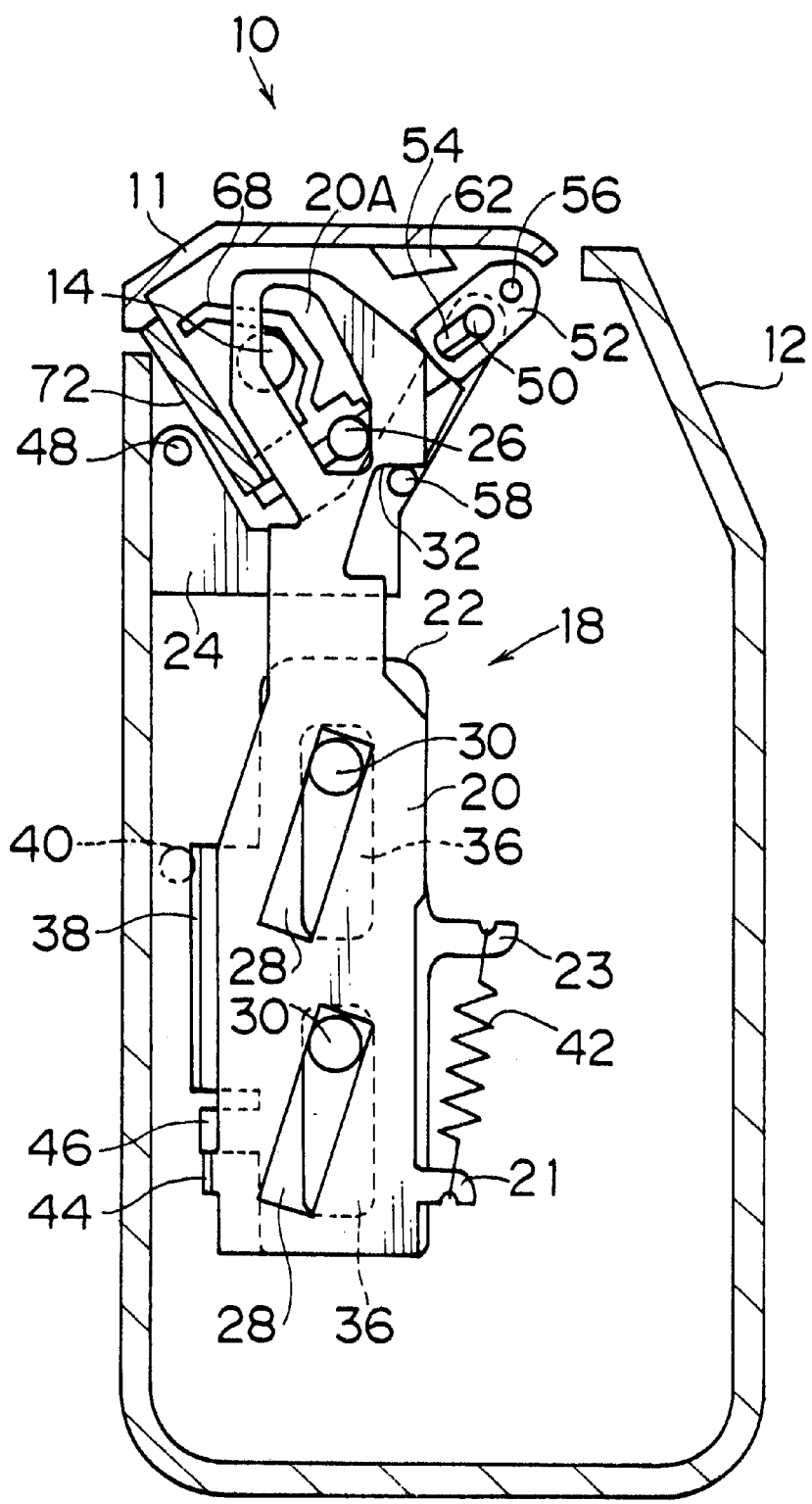
FIG. 1 is an inside view of a camera body showing a state where a retractable electronic flash assembly, built in a camera that has a moving mechanism according to a first embodiment of the present invention, is at an inactive position.
Figure 2:
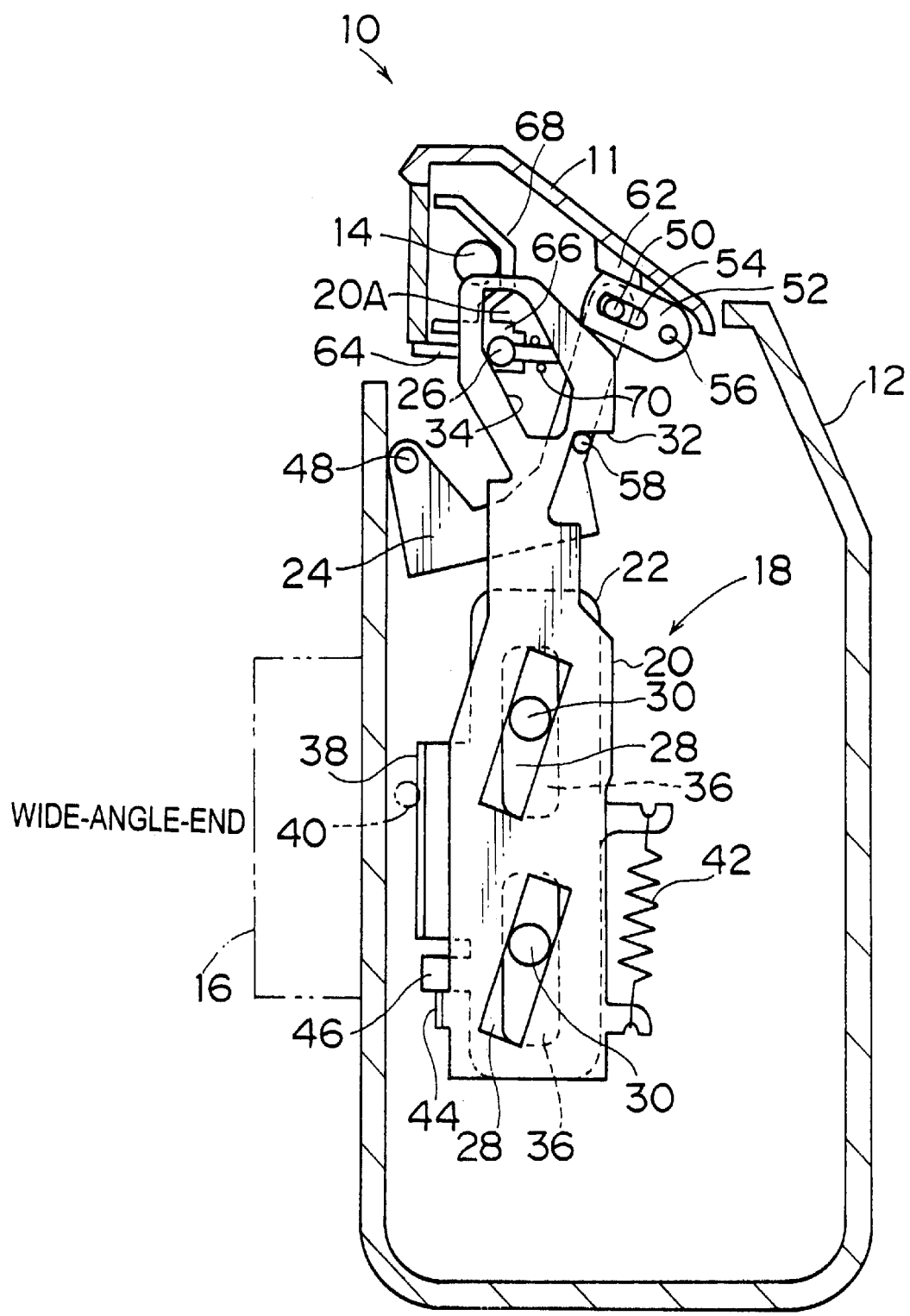
FIG. 2 is an inside view showing a state where the flash assembly in FIG. 1 is at a wide-angle-end position of an active position.
Figure 3:
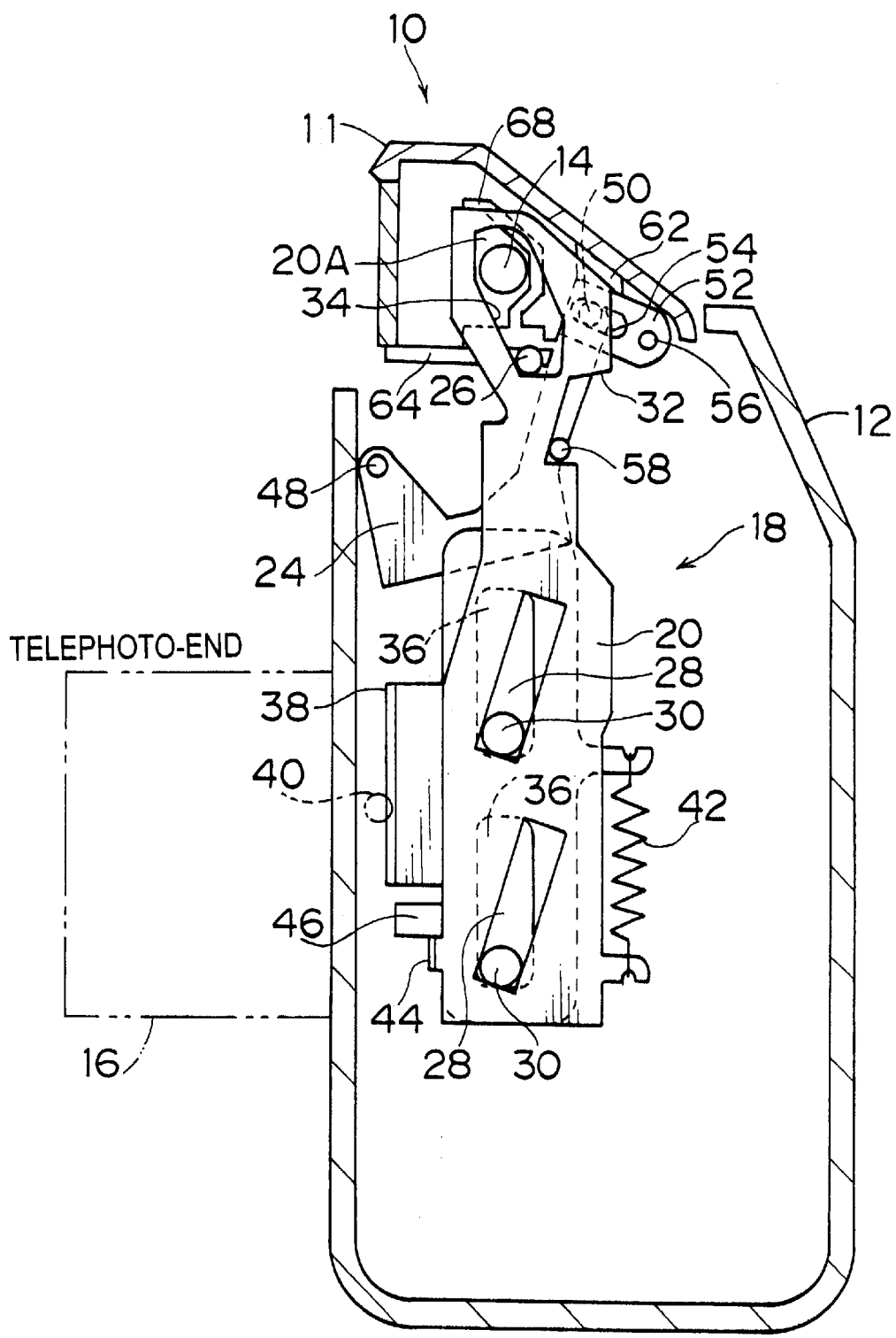
FIG. 3 is an inside view showing a state where the flash assembly in FIG. 1 is at a telephoto-end position of the active position.

FIG. 1 is an inside view showing a state where an electronic flash assembly 10 is stored at an inactive position in a camera body 12, and FIG. 2 is an inside view showing a state where the flash assembly 10 is at an active position and a flashtube 14 is at a wide-angle-end position, and FIG. 3 is an inside view showing a state where the flashtube 14 is at a telephoto-end position.

The flash assembly 10 in FIGS. 1, 2 and 3 operates in association with a retraction, a projection and a zooming of a taking-lens barrel 16 indicated by alternate long and two short dashes lines in FIGS. 2 and 3. When the taking-lens barrel 16 is retracted, the flash assembly 10 is at the inactive position shown in FIG. 1. When the taking-lens barrel 16 is protruded to a wide-angle-end position (an initial position), the flash assembly 10 is at the active position shown in FIG. 2. When the taking-lens barrel 16 is zoomed to a telephoto-end position, the flash assembly 10 is at the position shown in FIG. 3.

Figure 4:
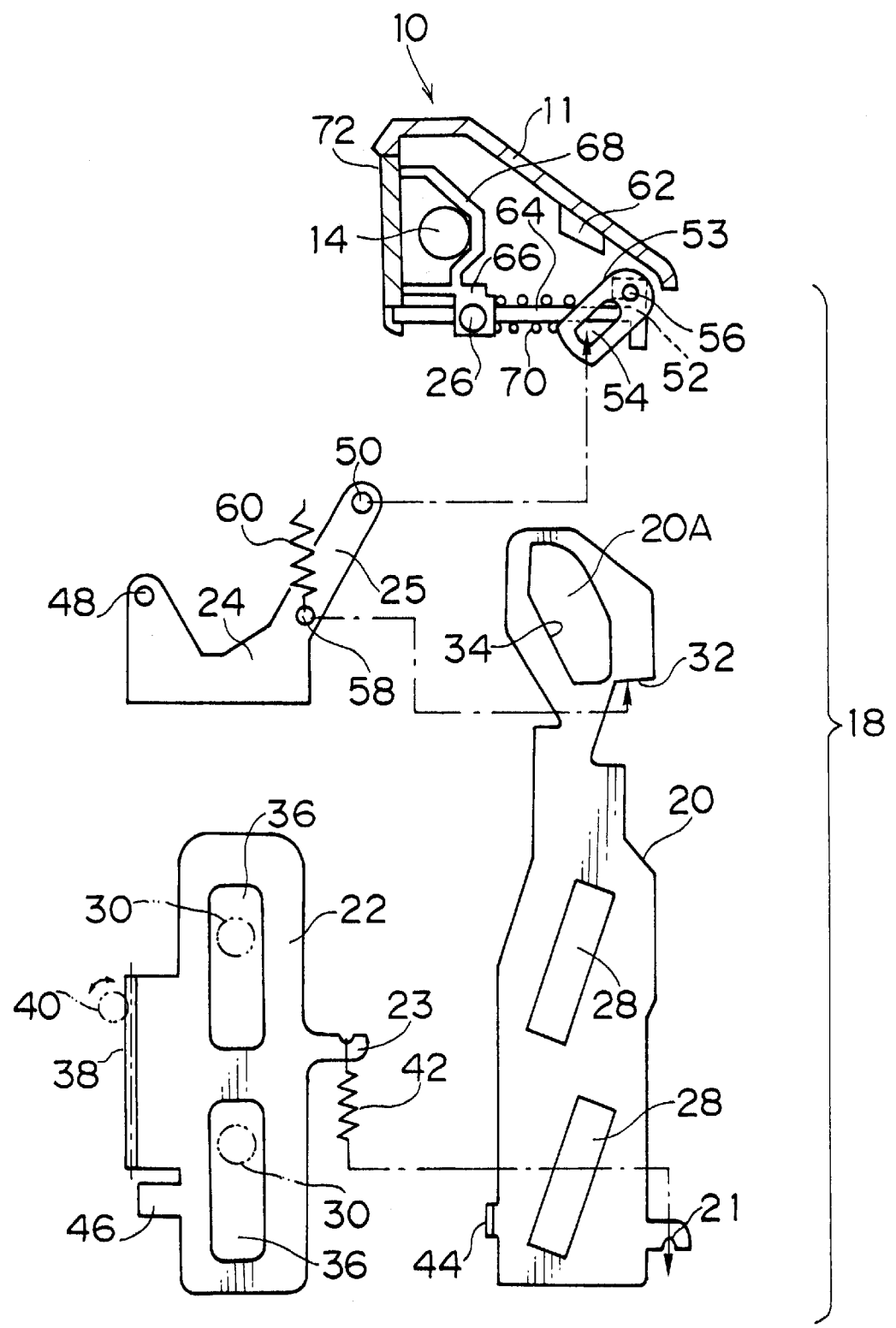
FIG. 4 is an explanation drawing showing members composing the moving mechanism according to the first embodiment.

A flash assembly moving mechanism 18, according to a first embodiment of the present invention, for moving the flash assembly 10 and the flashtube 14 will now be explained. As shown in FIG. 4, the moving mechanism 18 comprises a cam member or plate 20, a cam moving member or a rack member 22, an flash assembly moving member or a magnifying lever 24, a first cam follower 58 and a second cam follower 26.

A pair of slots 28 is formed in the center and bottom parts of the cam plate 20 The slots 28 are parallel to each other and slightly inclined to the right in FIGS. 1–3. The cam plate 20 is attached to the camera body 12 by engaging the slots 28 to a pair of guide pins 30 projecting from the camera body 12. When vertical force is applied to the cam plate 20 attached to the camera body 12, the cam plate 20 is diagonally moved to the upper right or the lower left in FIGS. 1–3 while being guided by the slots 28 and the guide pins 30. A first cam face 32 for moving the flash assembly 10 and a second cam face 34 for moving the flashtube 14 are formed on the cam plate 20 as shown in FIG. 4. The cam faces 32 and 34 will be explained later.

A pair of perpendicular slots 36 is vertically formed in the rack member 22, and the rack member 22 is attached to the camera body 12 by engaging the slots 36 to the pair of guide pins 30 (see FIGS. 1–3) projecting from the camera body 12. A rack 38 is perpendicularly formed at the left side of the rack member 22 in FIG. 4. A pinion 40 provided in the camera body 12 is engaged with the rack 38, and the pinion 40 is connected to an output shaft of a drive motor (not shown) through a reduction gear train. When the drive motor is driven, the force is transmitted to the rack member 22, which vertically moves while being guided by the slots 36 and the guide pins 30.

The rack member 22 and the cam plate 20 are connected to each other through a tension spring 42. The top end of the tension spring 42 is hooked on a hook 23 projecting from the right side of the rack member 22, and the bottom end of the tension spring 42 is hooked on a hook 21 projecting from the right side of the cam plate 20 in FIG. 1. The cam plate 20 and the rack member 22 are connected to each other while being forced by the tension spring 42 in such directions as to become closer to each other. When the rack member 22 moves upward, the cam plate 20 is pulled by the tension spring 42 to move upward. When an external force is applied to the cam plate 20 downward, the tension spring 42 extends to absorb the external force, and the external force is thereby prevented from being applied to the rack member 22 to damage the rack 38 and pinion 40.

A projection 44 is provided at the left side of the cam plate 20, and a corresponding projection 46 is provided at the left side of the rack member 22 as shown in FIG. 4. The projections 44 and 46 are pressed to each other by the tension spring 42. When the rack member 22 is moved downward, the projection 46 of the rack member 22 pushes down the projection 44 of the cam plate 20 to move the cam plate 20 downward.

The magnifying lever 24 is rotatably attached to the camera body 12 through a pin 48. A force transmission member or pin 50 is provided at the top end of an arm 25, which diagonally extends from the magnifying lever 24 to the upper right in FIG. 4, and the pin 50 is engaged with a slot 54 in a flash assembly moving lever 52 for moving (opening and closing) the flash assembly 10. The flash assembly moving lever 52 is rotatably supported on a shaft 56, and an flash assembly case 11 of the flash assembly 10 is rotatably supported on the shaft 56. The shaft 56 is inserted in a spiral spring (not shown), and the flash assembly 10 is forced by the spiral spring in a closing direction (a storing direction), which is counterclockwise in FIG. 4.

The first cam follower 58 is attached to the bottom part of the arm 25. The first cam follower 58 is supported to the camera body 12 through a forcing device or a tension spring 60, and the magnifying lever 24 is attached to the camera body 12 while being forced counterclockwise about the pin 48 by the tension spring 60. The first cam follower 58 is pressed to the first cam face 32 of the cam plate 20 by the tension spring 60, as shown in FIGS. 1 and 2.

Thus, as the cam plate 20 is moved upward from the position in FIG. 1, the magnifying lever 24 follows the first cam face 32 of the cam plate 20 and rotates counterclockwise about the pin 48 in association with the movement of the cam plate 20. When the cam plate 20 is moved upward, the magnifying lever 24 rotates in the forcing direction of the tension spring 60 (counterclockwise) since the first cam follower 58 is forced by the tension spring 60. As the magnifying lever 24 rotates counterclockwise, the magnifying lever 24 magnifies a movement of the cam plate 20 and the magnified movement is transmitted to the flash assembly moving lever 52. Thus, the flash assembly moving lever 52 rotates clockwise about the shaft 56, and then a top surface 53 of the flash assembly moving lever 52 comes into contact with a projection 62 provided on the inner surface of the flash assembly case 11 and presses the flash assembly case 11 upward. In accordance with this action, the flash assembly case 11 rotates clockwise about the shaft 56 to the active position in FIG. 2. The flash assembly 10 is kept at the active position by the tension spring 60. The moving range of the cam plate 20 between the position in FIG. 1 and the position in FIG. 2 is referred to as a first moving range of the cam plate.

On the other hand, the second cam follower 26 is slidably attached to a supporting member or a rod 64 through a flashtube moving member or a slider 66 as shown in FIG. 4. The rod 64 is horizontally arranged at the bottom of the flash assembly case 11 so that the second cam follower 26 can slide forward and backward. The bottom of a reflection umbrella 68 of the flashtube 14 is connected to the slider 66, and thus the flashtube 14 moves forward and backward with the reflection umbrella 68 to change the illumination angle when the second cam follower 26 is slid.

The second cam follower 26 is connected to one end of a compression spring 70 in which the rod 64 is inserted, and the other end of the compression spring 70 is fixed to the back end of the flash assembly case 11. Thus, the second cam follower 26 is forced forward by the compression spring 70, and the flashtube 14 is attached to the flash assembly case 11 while being forced in a wide-angle-end direction. A tension spring, in stead of the compression spring 70, may be provided between the slider 66 and the front end of the flash assembly case 11. Reference numeral 72 denotes a transparent window attached to the front face of the flash assembly case 11.

The second cam follower 26 is arranged in an opening 20A formed in the top of the cam plate 20 as shown in FIGS. 1–3, and the second cam face 34 is formed at the left edge of the opening 20A. The second cam face 34 is inclined to the left not to give a force to the second cam follower 26 in the first moving range of the cam plate 20 between the position in FIG. 1 and the position in FIG. 2. Thus, the flashtube 14 is kept at the wide-angle-end position in the first moving range of the cam plate 20 since the force is not transmitted to the second cam follower 26 from the second cam face 34. On the other hand, when the cam plate 20 is moved within a second moving range between the position in FIG. 2 and the position in FIG. 3, the second cam follower 26 is pressed by the second cam face 34 and moves backward against the force of the compression spring 70. The flashtube 14 is at the telephoto-end position in FIG. 3 when the cam plate 20 is at the end position of the second moving range.

An explanation will now be given of the operation of the moving mechanism 18 of the flash assembly 10 and the flashtube 14, which is constructed as described above.

First, when the power supply of the camera is turned ON at the state where the power supply is OFF in FIG. 1, the power is supplied to the motor to rotate the pinion 40 counterclockwise in FIG. 1. Thus, the rack member 22 is moved upward and the cam plate 20 is diagonally moved to the upper right while being pulled by the tension spring 42. As the cam plate 20 is moved in this direction, the magnifying lever 24 rotates counterclockwise about the pin 48 by the operations of the first cam face 32, the first cam follower 58 and the tension spring 60. As the magnifying lever 24 rotates in this direction, the movement of the cam plate 20 is magnified by the magnifying lever 24, and then the force of the cam plate 20 is transmitted to the flash assembly moving lever 52 through the magnifying lever 24 and the pin 50. Thus, the flash assembly moving lever 52 rotates clockwise about the shaft 56 by a large amount with a little movement of the cam plate 20, and then the top surface 53 of the flash assembly moving lever 52 comes into contact with the projecting piece 62 and presses the flash assembly case 11 upward. In accordance with these actions, the flash assembly 10 opens from the inactive position in FIG. 1 toward the active position. When the cam plate 20 reaches the end of the first moving range, the flash assembly 10 is at the active position and the flashtube 14 is at the wide-angle-end position, as shown in FIG. 2. At this time, the power supply to the motor is temporally turned OFF and the taking-lens barrel 16 stops at the wide-angle-end position. At the active position in FIG. 2, the flashtube 14 is kept at the wide-angle-end position since the second cam follower 26 is pressed to the second cam face 34 by the compression spring 70. When the power supply is turned OFF, the motor is driven in the opposite direction to move the rack member 22 and the cam plate 20 downward. Thus, the magnifying lever 24 rotates clockwise and the flash assembly moving lever 52 rotates counterclockwise to close the flash assembly 10. The flash assembly 10 thereby returns to the inactive position in FIG. 1.

To change the illumination angle of the flashtube 14, the power is supplied to the motor to rotate the pinion 40 counterclockwise in FIG. 2. Thus, the rack member 22 is further moved upward, and then the cam plate 20 is diagonally moved further to the upper right while being pulled by the tension spring 42. As the cam plate 20 is diagonally moved upward, the second cam follower 26, which is pressed to the second cam face 34, is moved backward while being guided by the rod 64, and then the flashtube 14 is at the telephoto-end position when the cam plate 20 is at the end of the second moving range as shown in FIG. 3.

To move the flashtube 14 from the telephoto-end position to the wide-angle-end position, the pinion 40 is rotated clockwise in FIG. 3. Thus, the flashtube 14 is moved to the wide-angle-end position since the second cam follower 26 moves forward while being pressed to the second cam face 34.

Therefore, the illumination angle of the flashtube 14 is changed by moving the cam plate 20 within the second moving range between the position in FIG. 2 and the position in FIG. 3, and the taking-lens barrel 16 is zoomed in association with the change of the illumination angle. Thus, the illumination angle of the flashtube 14 is changed in accordance with the zooming of the taking-lens barrel 16.

Figure 5:
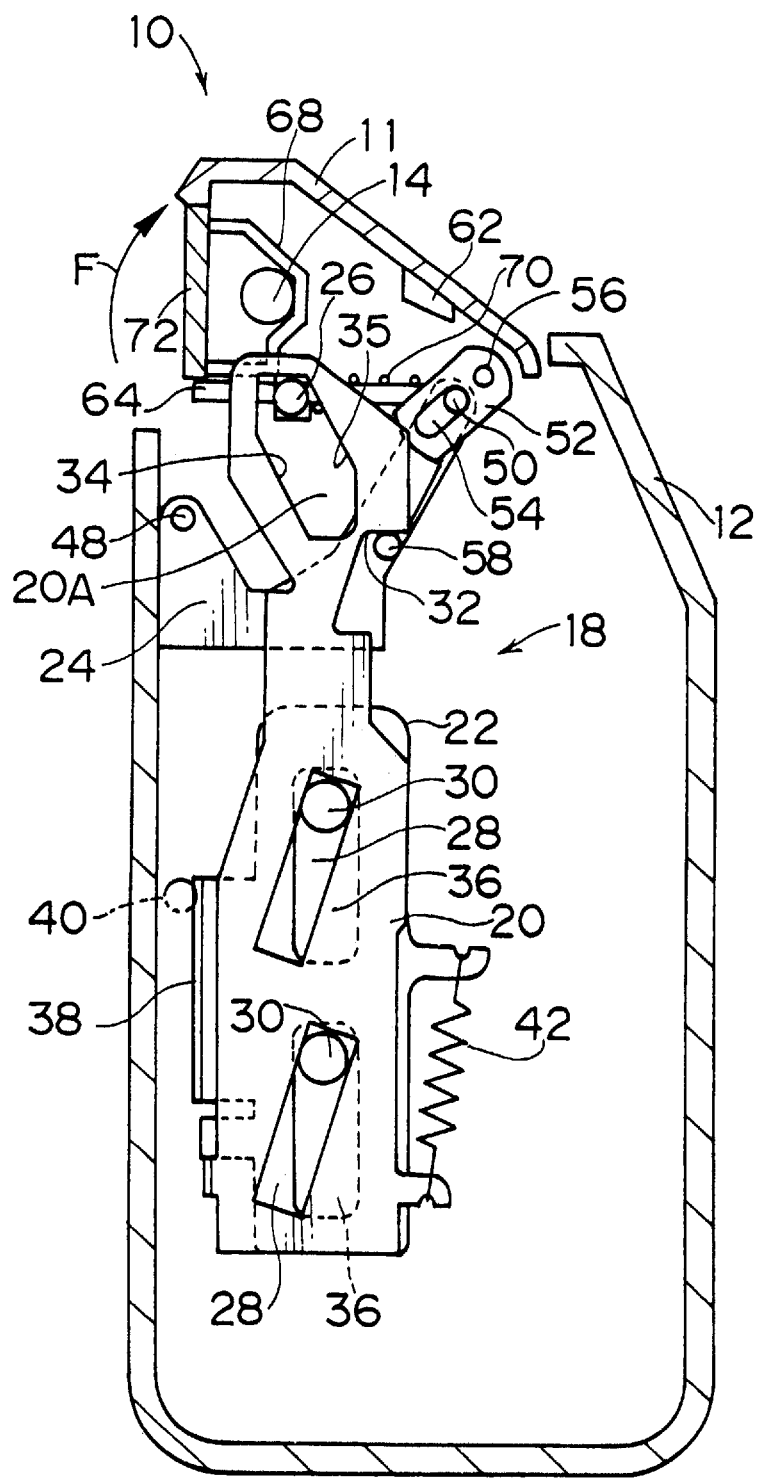
FIG. 5 is an explanation drawing when an external force is applied to the flash assembly in FIG. 1 in an opening direction.

FIG. 5 is a view showing a state where an external force F is applied to the flash assembly 10 in the opening direction when the flash assembly 10 is stored in the camera body 12 and the power supply is OFF. When the external force F is applied to the flash assembly 10, the flash assembly 10 rotates in the opening direction about the shaft 56 against the force of the spiral spring, which forces the flash assembly 10 in the closing direction. At this time, t e second cam follower 26 is moved upward along a third cam face 35, which is formed opposite to the second cam face 34. Thus, the force of the second cam follower 26 is not transmitted to the cam plate 20. When the flash assembly 10 is relieved of the external force F, the flash assembly 10 is returned to the inactive position in FIG. 1 by the spiral spring. Thus, the moving mechanism 18 including the motor is not damaged even if the external force F is applied to the flash assembly 10, and the flash assembly 10 returns to the original inactive position when the flash assembly 10 is relieved of the external force F.

Figure 6:
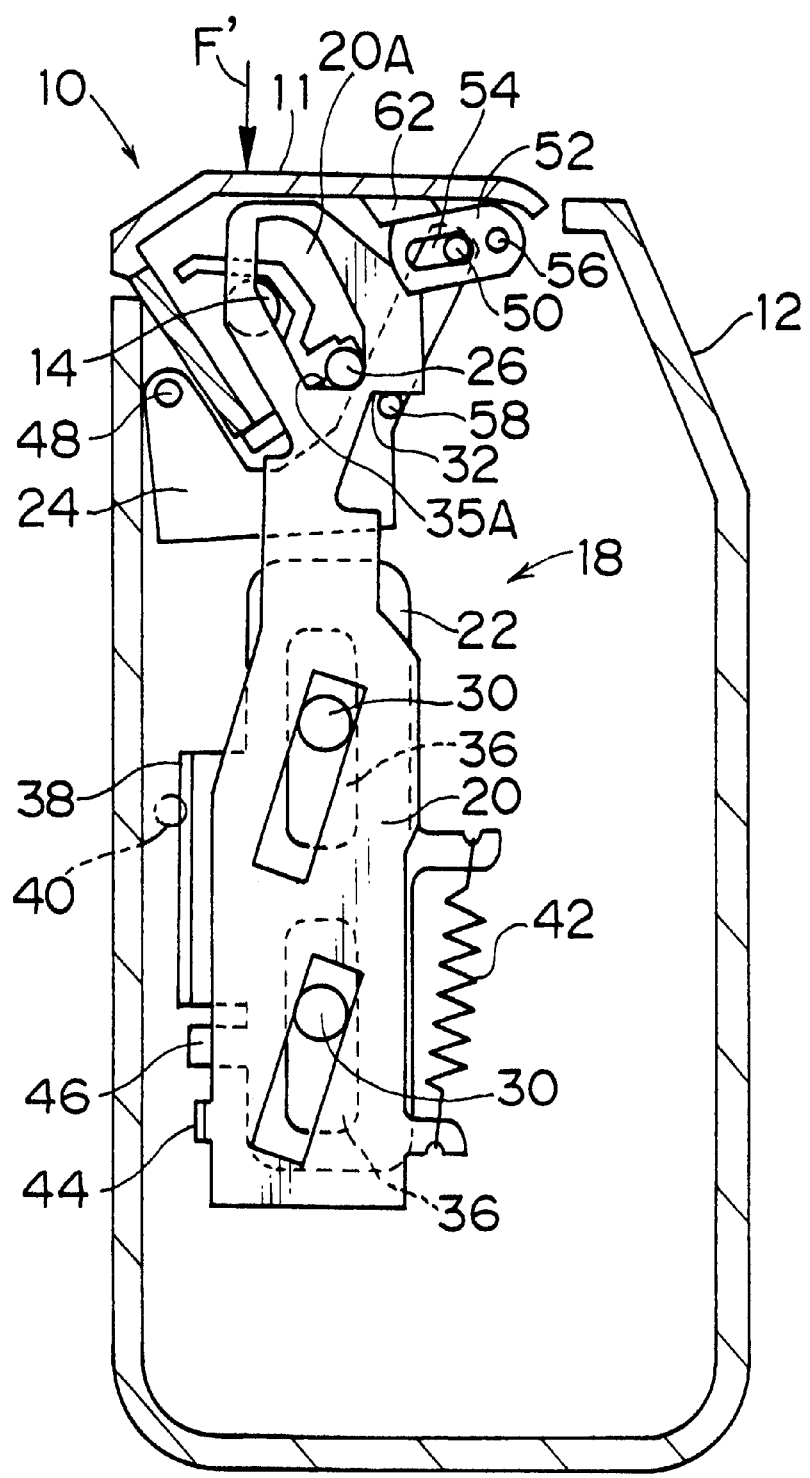
FIG. 6 is an explanation drawing when a power supply is turned ON in a state where an external force is applied to the flash assembly in FIG. 1 in a closing direction.

FIG. 6 is an assistance view when the power supply is turned ON in a state where an external force F' is applied to the flash assembly 10 in the closing direction. When the power supply is turned ON, the cam plate 20 moves upward and a bottom surface 35A of the opening 20A of the cam plate 20 comes into contact with the second cam follower 26. The cam plate 20 thereby stops moving upward, and only the rack member 22 moves upward and the tension spring 42 is extended. Thus, the force of the motor is absorbed by the tension spring 42 not to be further transmitted to the cam plate 20. On the other hand, when the flash assembly 10 is relieved of the external force F' in the state of FIG. 6, the cam plate 20 moves upward by the restoring force of the tension spring 42 since the restoring force of the tension spring 42 is applied to the cam plate 20, and thus the flash assembly 10 reaches the active position. Therefore, the moving mechanism 18 including the motor is not damaged even if the power supply is turned ON in the state where the external force F' is applied to the flash assembly 10, and the flash assembly 10 reaches the active position when the flash assembly 10 is relieved of the external force F'.

According to the moving mechanism 18 constructed as described above, the flash assembly 10 and the flashtube 14 are regularly moved by the cam plate 20, in which the first cam face 32 for moving the flash assembly 10 and the second cam face 34 for moving the flashtube 14 are formed, and thus the structure of the moving mechanism 18 is simplified. The moving mechanism 18 comprises the cam plate 20, the rack member 22, the magnifying lever 24 and the first and second cam followers 58 and 26, and the number of the parts as a whole is reduced to simplify the structure of the moving mechanism 18.

In the moving mechanism 18, the cam plate 20 and the rack member 22 are connected to each other through the tension spring 42. The tension spring 42 absorbs the external force F (see FIG. 5) applied from the flash assembly 10 to the cam plate 20 and the force of the motor cause by the external force F' (see FIG. 6). Thus, the members of the moving mechanism 18 are protected from the external forces F and F'.

In the moving mechanism 18, the movement of the cam plate 20 is magnified by the magnifying lever 24 and the magnified movement is transmitted to the flash assembly 10. Thus, the moving mechanism 18 can instantly open and close the flash assembly 10 with the small movement of the cam plate 20.

In the moving mechanism 18, the flash assembly 10 is forced toward the active position by the tension spring 60 so that the flash assembly 10 can be smoothly positioned at the active position without shaking. The tension spring 60 can absorb the external force F' applied to the flash assembly 10 in the closing direction.

Figure 7:
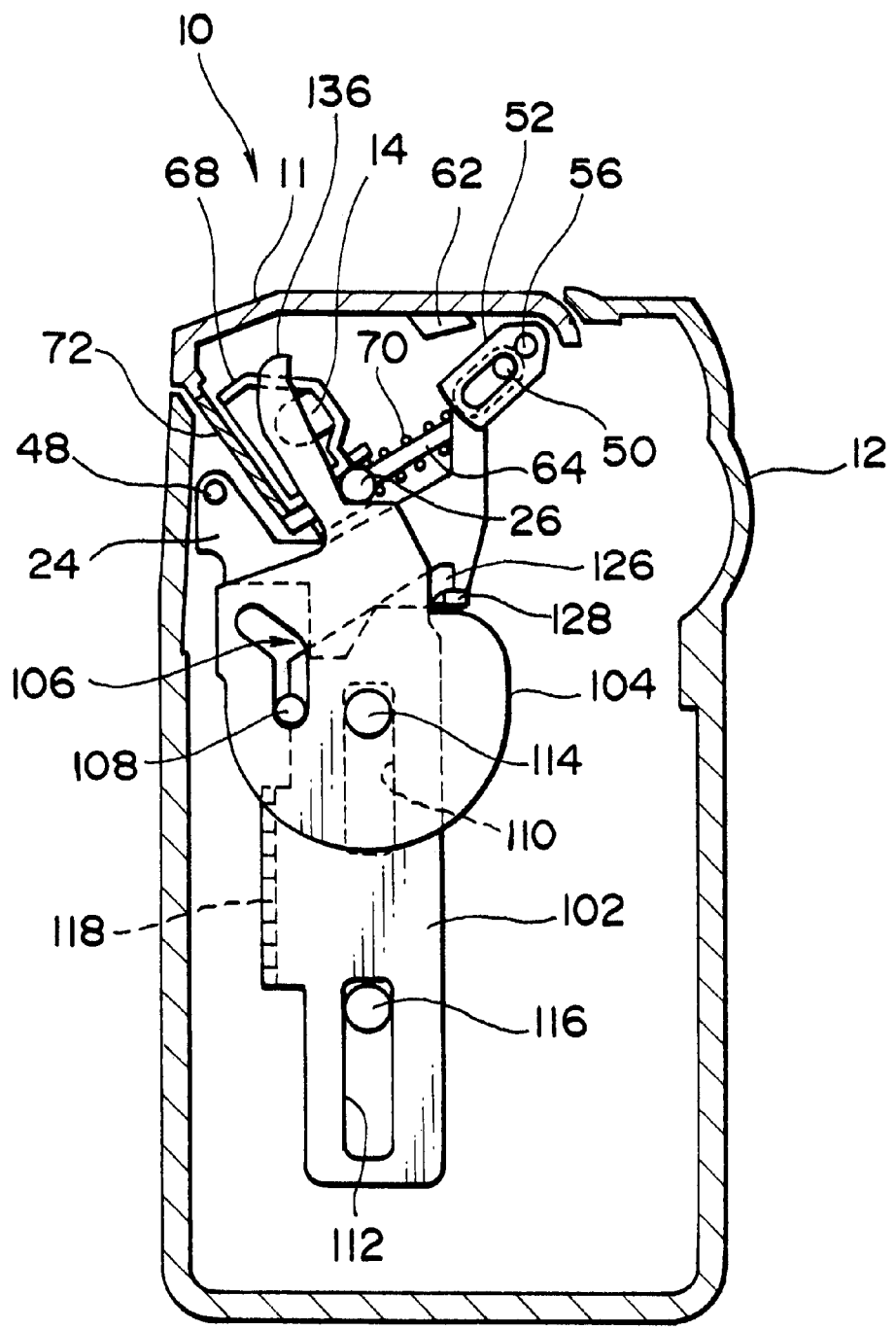
FIG. 7 is an inside view showing a state where an electronic flash assembly, built in the camera that has a moving mechanism according to a second embodiment of the present invention, is at the inactive position.
Figure 8:
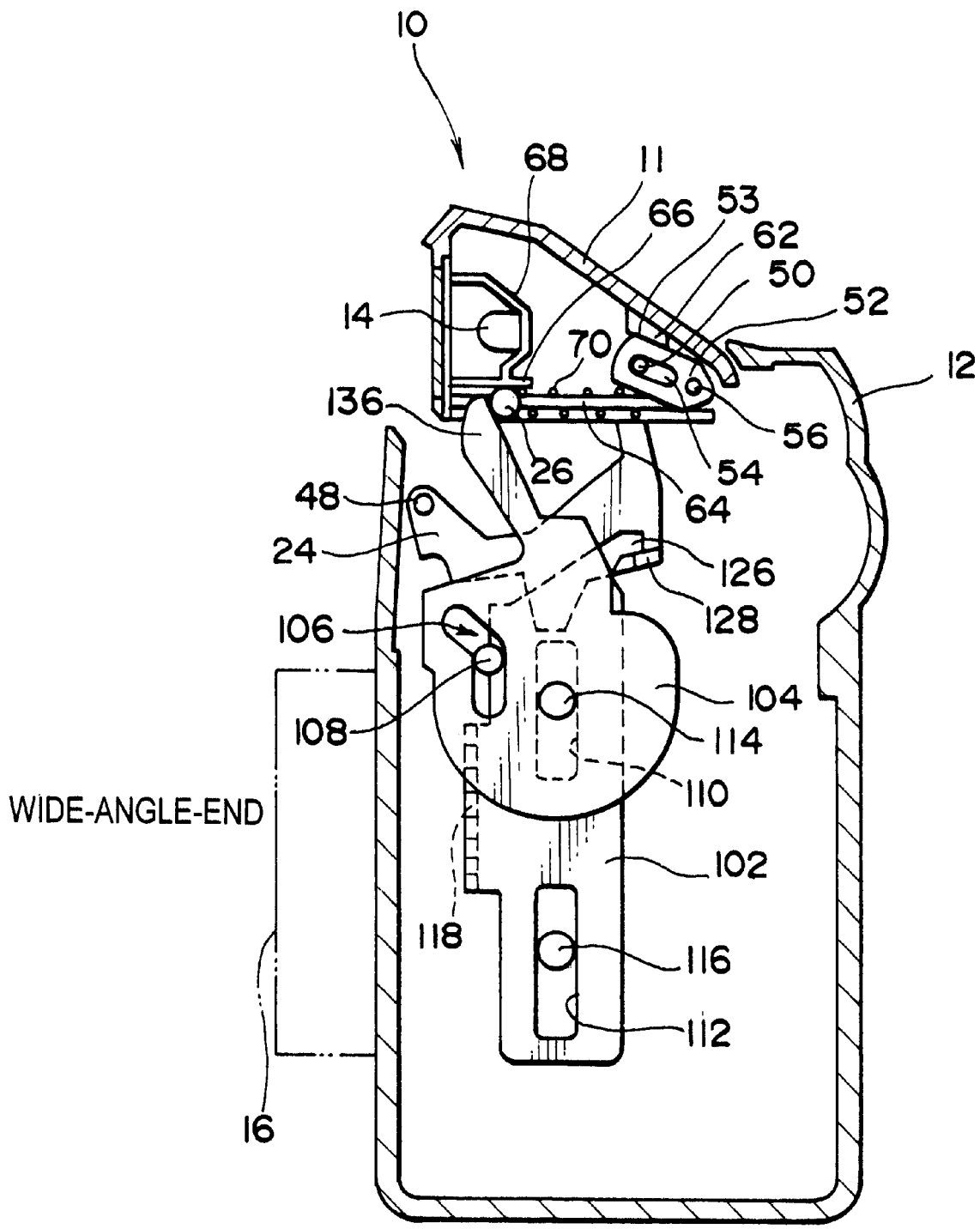
FIG. 8 is an inside view showing a state where the flash assembly in FIG. 7 is at the wide-angle-end position of the active position.
Figure 9:
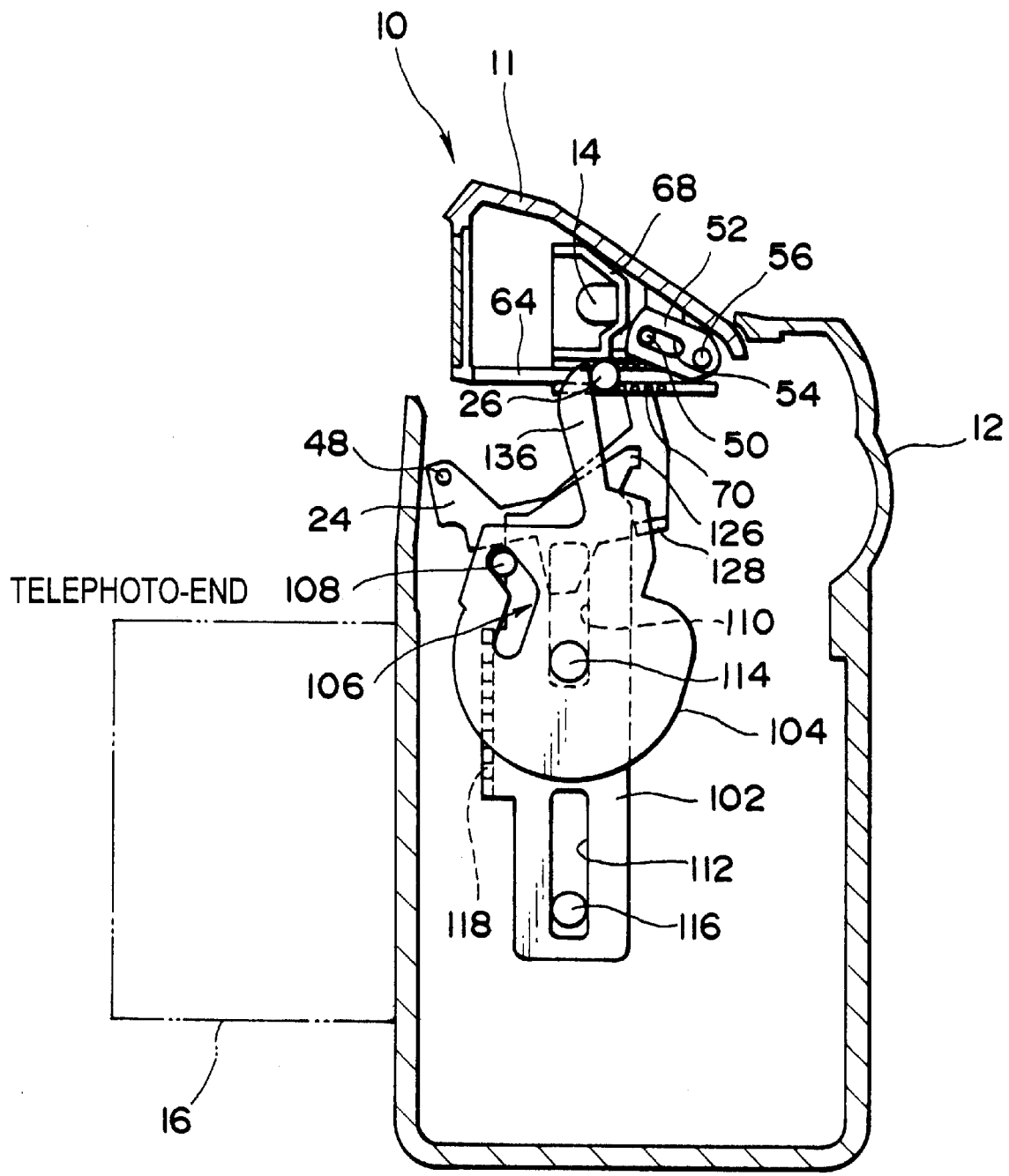
FIG. 9 is an inside view showing a state where the flash assembly in FIG. 7 is at the telephoto-end position of the active position.

FIG. 7 is an inside view showing a state where the flash assembly 10 is stored in the camera body 12 by a moving mechanism according to a second embodiment, and FIG. 8 is an inside view showing a state where the flash assembly 10 is at the active position and the flashtube 14 is at the wide-angle-end position, and FIG. 9 is an inside view showing a state where the flashtube 14 is at the telephoto-end position. In the second embodiment, the same members as or similar members to those in the first embodiment in FIGS. 1–6 are denoted by the same reference numerals.

The flash assembly 10 and the flashtube 14 in FIGS. 7, 8 and 9 operate in association with the retraction, the projection and the zooming of the taking-lens barrel 16 indicated by alternate long and two short dashes lines in FIGS. 8 and 9. When the taking-lens barrel 16 is retracted, the flash assembly 10 and the flashtube 14 are at the inactive position shown in FIG. 7. When the taking-lens barrel 16 is protruded to the wide-angle-end position (the initial position), the flash assembly 10 and the flashtube 14 are at the active position shown in FIG. 8. When the taking-lens barrel 16 is zoomed to the telephoto-end position, the flashtube 14 is at the position shown in FIG. 9.

A flash assembly moving mechanism 100 according to the second embodiment will now be explained.

Figure 10:
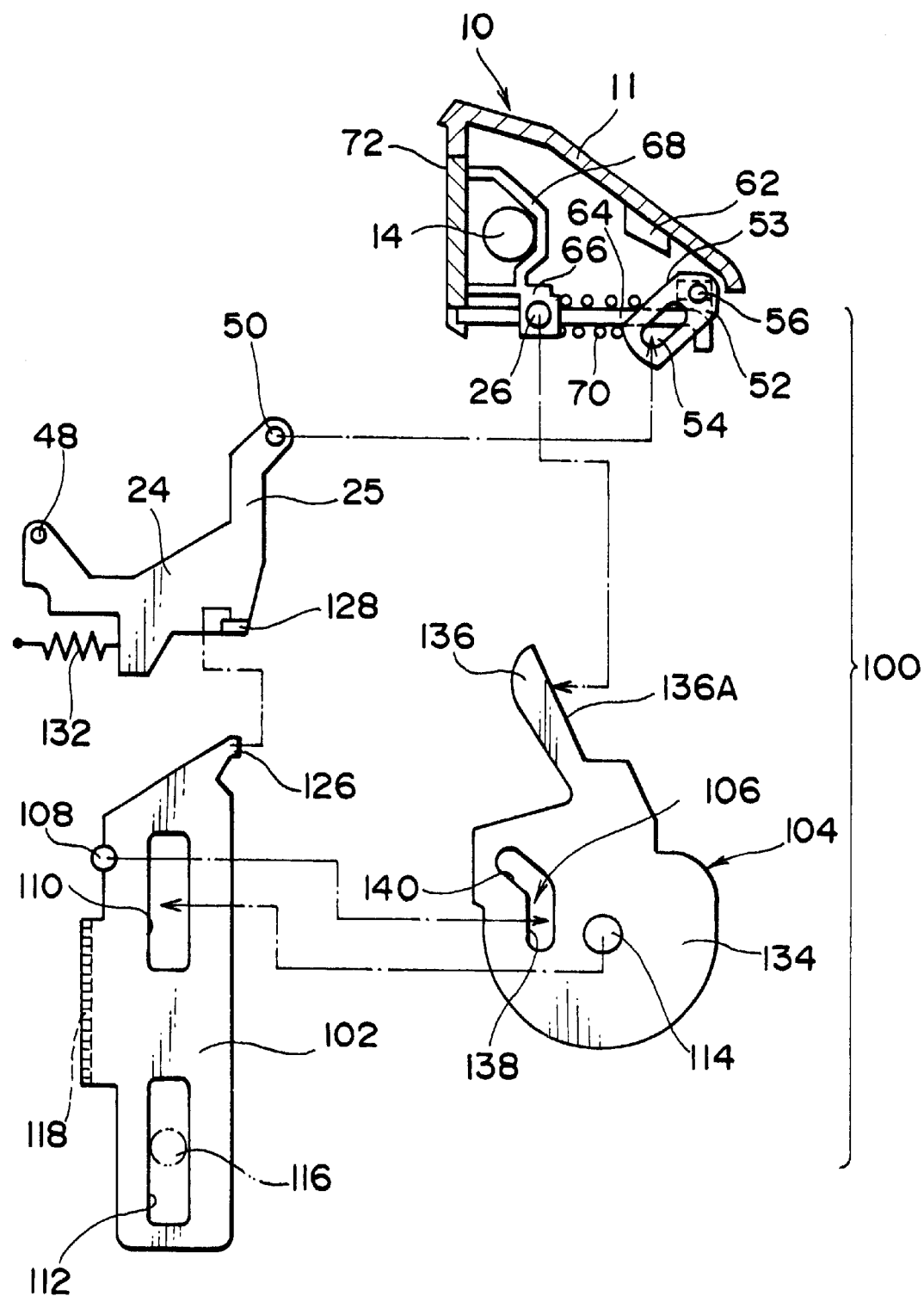
FIG. 10 is an explanation drawing showing members composing the moving mechanism according to the second embodiment.
Figure 11:
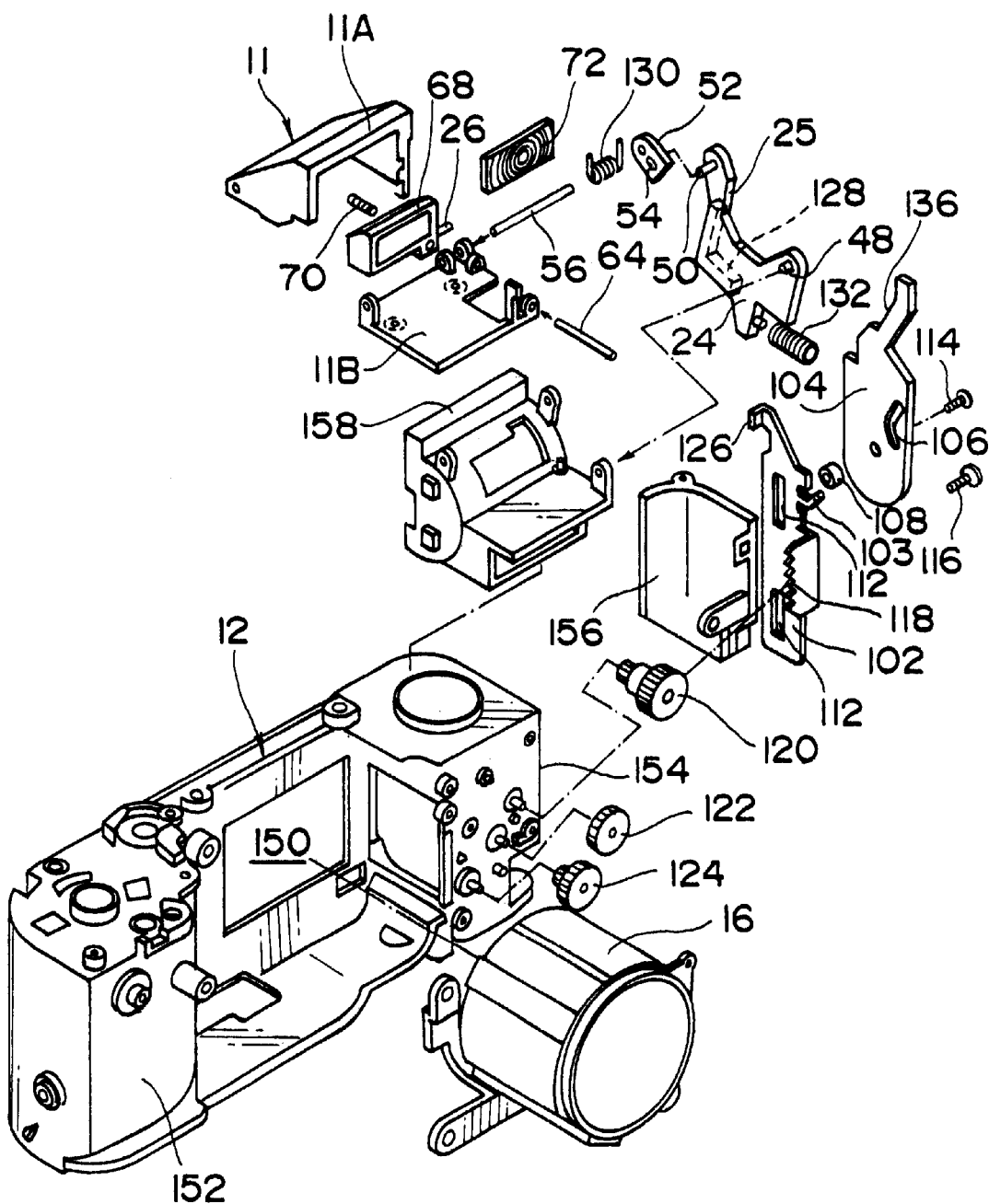
FIG. 11 is an assembly perspective view of the moving mechanism in FIG. 7 with respect to the camera body

As shown in FIGS. 10 and 11, the moving mechanism 100 comprises a first moving member or a rack member 102, a second moving member or a cam plate 104, the magnifying lever 24, and a cam mechanism composed of a cam groove 106 and a cam pin 108.

A pair of slots 110, 112 is vertically formed in the rack member 102, and the rack member 102 is attached to the side of the camera body 12 in FIG. 11 by engaging the slots 110, 112 to guide pins 114, 116 projecting from the side of the camera body 12. A rack 118 is vertically formed at the left side of the rack member 102 in FIG. 11. A pinion 120 provided on the front of the camera body 12 is engaged with the rack 118, and the pinion 120 is connected to an output shaft of a drive motor (not shown) through reduction gears 122, 124. When the drive motor is driven forward or backward, the force is transmitted to the rack member 102, which vertically moves while being guided by the slots 110, 112 and the guide pins 114, 116.

The cam pin 108 is attached to the top of the rack 118 of the rack member 102 through a projecting part 103 (see FIG. 11), and the cam pin 108 is coupled with a cam groove 106 in the cam plate 104. The cam plate 104 will be described later. A bent claw 126 is formed at the top end of the rack member 102, and the claw 126 is coupled with a coupling part 128 formed at the bottom of the magnifying lever 24. The claw 126 is kept coupled with the coupling part 128 while the rack member 102 moves between the retracted position shown in FIG. 7 and the wide-angle-end position shown in FIG. 8. While the rack member 102 moves between the wide-angle-end position shown in FIG. 8 and the telephoto-end position shown in FIG. 9, the claw 126 is moved away from the coupling part 128 to be relieved of the coupling.

The magnifying lever 24 is rotatably attached to the side of the camera body 12 through the pin 48 as shown in FIG. 11. The pin 50 is provided at the top end of the arm 25, which diagonally extends to the upper right of the magnifying lever 24 in FIG. 10, and the pin 50 is engaged with the slot 54 in the flash assembly moving lever 52 for moving (opening and closing) the flash assembly 10. The flash assembly moving lever 52 is rotatably supported on the shaft 56. The flash assembly 10 is coupled with a spiral spring 130, in which the shaft 56 is inserted, and the flash assembly 10 is forced by the spiral spring 130 in the closing direction, which is counterclockwise in FIG. 10, about the shaft 56.

The flash assembly case 11 of the flash assembly 10 is composed of an upper case 11A and a lower case 11B as shown in FIG. 11, and is rotatably supported on the shaft 56. The magnifying lever 24 is supported to the camera body 12 through the forcing device or a compression spring 132, and the magnifying lever 24 is attached to the camera body 12 while being forced counterclockwise in FIG. 10 about the pin 48 by the compression spring 132.

When the rack member 102 is moved upward from the position in FIG. 7, the claw 126 moves upward to relieve the coupling part 128. Thus, the magnifying lever 24 rotates counterclockwise about the pin 48 by the compression spring 132 as shown in FIG. 8. As the magnifying lever 24 rotates in this direction, the magnifying lever 24 magnifies a movement of the rack member 102 and the magnified movement is transmitted to the flash assembly moving lever 52. Thus, the flash assembly moving lever 52 rotates clockwise about the shaft 56, and then the top surface 53 of the flash assembly moving lever 52 comes into contact with the projecting piece 62 attached to the inner surface of the flash assembly case 11 to press the flash assembly case 11 upward. In accordance with this action, the flash assembly case 11 rotates clockwise about the shaft 56 against the force of the spiral spring 130 to the active position in FIG. 8. The flash assembly 10 is kept at the active position by the compression spring 132. The moving range of the rack member 102 between the position in FIG. 7 and the position in FIG. 8 is the first moving range, and the moving range of the rack member 102 between the position in FIG. 8 and the position in FIG. 9 is the second moving range.

The cam plate 104 comprises a cam plate body 134, which is substantially formed like a disc, and an arm part 136, which projects upward from the cam plate body 134. The center of the cam plate body 134 is supported by the guide pin 114. The cam groove 106 is formed in the left side of the cam plate body 134 in FIG. 10, and the cam groove 106 is composed of a first cam groove 138 that vertically extends and a second cam groove 140 that connects to the top of the first cam groove 138 and diagonally extends to the upper left.

The cam pin 108 of the rack member 102 is coupled with the cam grooves 138 or 140, and the cam pin 108 moves vertically in the first cam groove 138 while the rack member 102 is within the first moving range between the position in FIG. 7 and the position in FIG. 8. Thus, the force is not transmitted from the rack member 102 to the cam plate 104 while the rack member 102 is within the first moving range. On the other hand, the cam pin 108 moves in the second cam groove 140 while the rack member 102 is within the second moving range between the position in FIG. 8 and the position in FIG. 9. The force is transmitted from the rack member 102 to the cam plate 104 while the rack member 102 is within the second moving range. Thus, when the rack member 102 moves from the position in FIG. 8 to the position in FIG. 9, the cam plate 104 rotates clockwise by a predetermined angle from the position in FIG. 8 to the position in FIG. 9 about the guide pin 114. The second cam follower 26 in contact with a slide surface 136A of the arm part 136 is thereby pressed by the arm part 136 to move to the right in FIG. 8, and thus the flashtube 14 connected to the second cam follower 26 moves backward (to the right) with the reflection umbrella 68 to change the illumination angle.

The supporting mechanism of the flashtube 14 is the same as that in the first embodiment in FIG. 4, and it will not be explained here. The outline of the structure of the camera body 12 in FIG. 11 will be given. A rectangular exposure opening 150 is formed in the center of the camera body 12, and the taking-lens barrel 16 is arranged in front of the exposure opening 150. A chamber 152 for a film cartridge is formed at the left side of the exposure opening 150 in FIG. 11, and a winding chamber 154 is formed at the right side of the exposure opening 150. A side opening of the winding chamber 154 is covered with a cover 156, and the flash assembly moving mechanism 100 is arranged outside the cover 156. A battery chamber 158 is attached above the winding chamber 154, and the flash assembly 10 is arranged above the battery chamber 158.

An explanation will now be given of the operation of the flash assembly moving mechanism 100, which is constructed as described above.

First, when the power supply of the camera is turned ON at the state where the power supply is OFF in FIG. 7, the power is supplied to the motor to rotate the pinion 120 counterclockwise in FIG. 11. Thus, the rack member 22 is moved upward and the magnifying lever 24 is rotated counterclockwise about the pin 48 by the compression spring 132 from the position in FIG. 7 to the position in FIG. 8. As the magnifying lever 24 rotates in this direction, the movement of the rack member 102 is magnified by the magnifying lever 24 and the magnified movement is transmitted to the flash assembly moving lever 52 through the pin 50. Thus, the flash assembly moving lever 52 rotates clockwise about the shaft 56 by a large amount with a little movement of the rack member 102, and then the top surface 53 of the flash assembly moving lever 52 comes into contact with the projecting piece 62 to press the flash assembly case 11 upward. In accordance with this action, the flash assembly 10 opens from the inactive position in FIG. 7 toward the active position in FIG. 8. When the cam plate 20 reaches the end of the first moving range, the flash assembly 10 is at the active position and the flashtube 14 is at the wide-angle-end position, as shown in FIG. 8. At this time, the power supply to the motor is temporally turned OFF and the taking-lens barrel 16 stops at the wide-angle-end position. At the active position, the flashtube 14 is kept at the wide-angle-end position since the second cam follower 26 is pressed to the slide surface 136A of the arm part 136 of the cam plate 104 by the compression spring 70. When the power supply is turned OFF, the motor is driven in the opposite direction to move the rack member 102 downward. Thereby, the claw 126 presses the coupling part 128 downward, the magnifying lever 24 is rotated clockwise, the flash assembly moving lever 52 is rotated counterclockwise, the top surface 53 of the flash assembly moving lever 52 relieves the projecting piece 62 of the flash assembly case 11, and the flash assembly 10 is closed. The flash assembly 10 returns to the inactive position in FIG. 7 in this manner.

To change the illumination angle of the flashtube 14 in FIG. 8, the power is supplied to the motor to rotate the pinion 120 counterclockwise in FIG. 11. Thus, the rack member 102 gets out of the first moving range to move within the second moving range, and the cam plate 104 is pressed by the cam pin 108 to rotate clockwise from the position in FIG. 8 toward the position in FIG. 9. As the cam plate 104 is rotated in this direction, the second cam follower 26 moves backward (to the right in FIG. 8) while being pressed by the arm part 136 of the cam plate 104 and guided by the rod 64. Then, the flashtube 14 is at the telephoto-end position when the rack member 102 is at the end of the second moving range as shown in FIG. 9.

To move the flashtube 14 from the telephoto-end position to the wide-angle-end position, the pinion 120 is rotated clockwise in FIG. 11. Thus, the flashtube 14 is moved to the wide-angle-end position since the second cam follower 26 moves forward (to the left in FIG. 9) while being pressed to the arm part 136.

Therefore, the illumination angle of the flashtube 14 is changed by moving the rack member 102 within the second moving range between the position in FIG. 8 and the position in FIG. 9, and the taking-lens barrel 16 is zoomed in association with the change of the illumination angle. The illumination angle of the flashtube 14 is thus changed in accordance with the zooming.

Figure 12:
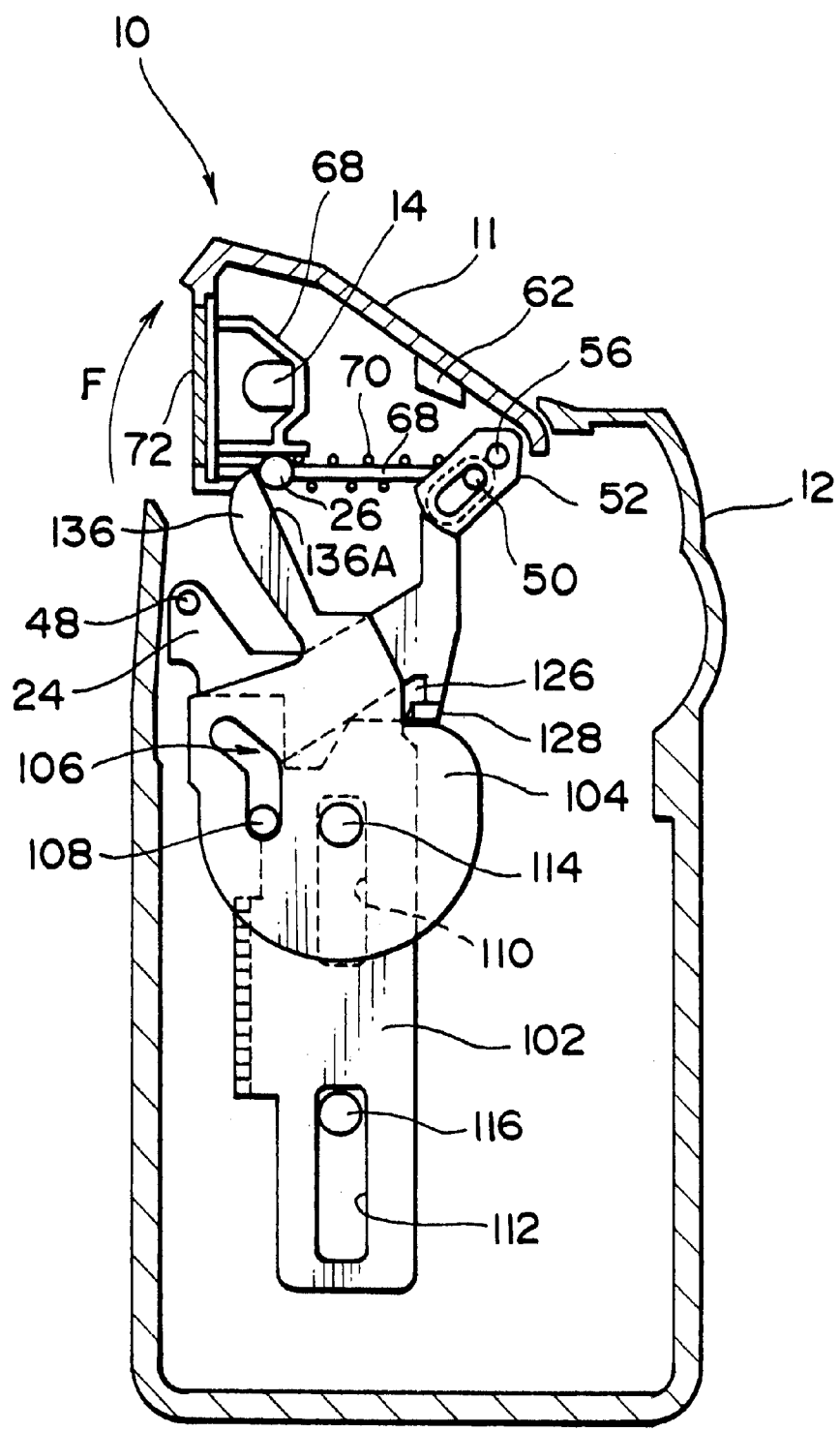
FIG. 12 is an explanation drawing when an external force is applied to the flash assembly in FIG. 7 in the opening direction.

FIG. 12 is a view showing a state where an external force F is applied to the flash assembly 10 in the opening direction when the flash assembly 10 is stored in the camera body 12 and the power supply is OFF. When the external force F is applied to the flash assembly 10 in the inactive position in FIG. 7, the flash assembly 10 rotates in the opening direction (clockwise in FIG. 7) about the shaft 56 against the force of the spiral spring 130 to the position in FIG. 12. At this time, the second cam follower 26 is moved upward along the slide surface 136A of the arm part 136. Thus, the force of the second cam follower 26 is not transmitted to the arm part 136. When the flash assembly 10 is relieved of the external force F, the force of the spiral spring 130 is transmitted to the flash assembly 10 to return the flash assembly 10 to the inactive position in FIG. 7. Thus, the moving mechanism 100 including the motor is not damaged even if the external force F is applied to the closed flash assembly 10, and the flash assembly 10 returns to the original inactive position when the flash assembly 10 is relieved of the external force F.

Figure 13:
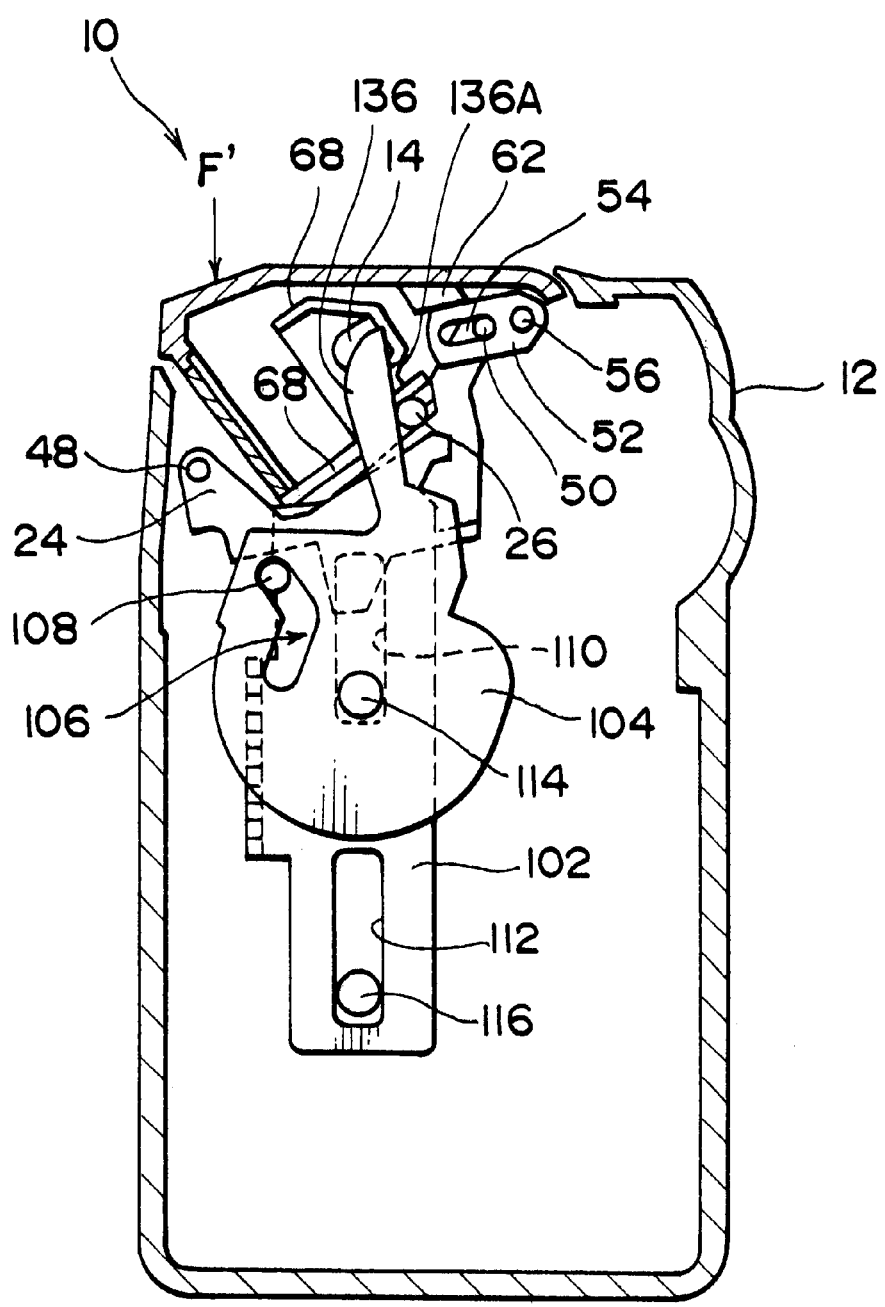
FIG. 13 is an explanation drawing when the power supply is turned ON in a state where an external force is applied to the flash assembly in FIG. 7 in the closing direction.

FIG. 13 is a view showing a state where an external force F' is applied to the flash assembly 10, at the active position in FIG. 9, in the closing direction. When the external force F' is applied to the flash assembly 10 in FIG. 9, the magnifying lever 24 is pressed downward by the flash assembly 10 and rotates clockwise about the pin 48 against the force of the compression spring 132 to the position in FIG. 13. At this time, the force of the second cam follower 26 is not transmitted to the arm part 136 since the second cam follower 26 moves downward along the slide surface 136A of the arm part 136. When the flash assembly 10 is relieved of the external force F', the magnifying lever 24 returns to the original position and the flash assembly 10 is pressed by the flash assembly moving lever 52 to open. Therefore, the moving mechanism 100 including the motor is not damaged even if the external force F' is applied to the flash assembly 10 at the active position, and the flash assembly 10 returns to the active position when the flash assembly 10 is relieved of the external force F'. These actions are similarly performed when the external force F' is applied to the flash assembly 10 at the active position in FIG. 8 and when the flash assembly 10 is relieved of the external force F'.

According to the moving mechanism 100 constructed as described above, the rack member 102 and the cam plate 104 are connected to each other through the cam mechanism, and the flash assembly 10 is moved when the rack member 102 is within the first moving range, and the cam plate 104 is rotated to move the flashtube 14 when the rack member 102 is within the second moving range; that is, the cam plate 104 moves in association with the rack member 102. Thus, the structure of the moving mechanism 100 is simpler than that of a mechanism that separately moves the rack member 102 and the cam plate 104. The action timing of the cam plate 104 with respect to the rack member 102 is set more easily in the moving mechanism 100 than that is set in the mechanism that separately moves the rack member 102 and the cam plate 104, since the cam plate 104 is moved in association with the rack member 102 by the cam mechanism. In the moving mechanism 100, the flash assembly 10 is forced toward the active position by the compression spring 130, so that the flash assembly 10 can be smoothly positioned at the active position.

As set forth hereinabove, the camera with the retractable electronic flash assembly is provided with the cam member that has the first cam face for moving the flash assembly and the second cam face for moving the flashtube, and the cam member is moved within the first moving range to move the flash assembly and within the second moving range to move the flashtube. Thus, the moving mechanism of the flash assembly and the flashtube can be simplified.

As set forth hereinabove, the camera with the retractable electronic flash assembly is provided with the moving mechanism including the cam mechanism that moves the second moving member for moving the flashtube in association with the first moving member for moving the flash assembly. Thus, the structure of the moving mechanism is simpler than that of a mechanism that separately moves the first moving member and the second moving member.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera, comprising:

a camera body;

a flash assembly which is movable between an inactive position where the flash assembly is stored in the camera body and an active position where the flash assembly is protruded from the camera body;

a flashtube arranged in the flash assembly movably forward and backward to change an illumination angle; and a flash assembly moving mechanism including a cam member having a first cam face for moving the flash assembly and a second cam face for moving the flashtube, wherein the flash assembly is moved while being guided by the first cam face when the cam member moves within a first moving range, and the flashtube is moved while being guided by the second cam face when the cam member moves within a second moving range beyond the first moving range.

2. The camera as defined in claim 1, wherein the flash assembly is forced toward the active position by a forcing device.

3. A camera, comprising:

a camera body;

a flash assembly which is movable between an inactive position where the flash assembly is stored in the camera body and an active position where the flash assembly is protruded from the camera body;

a flashtube arranged in the flash assembly movably forward and backward to change an illumination angle;

a first moving member arranged in the camera body movably in a predetermined direction, the first moving member moving the flash assembly when the first moving member moves within a first moving range;

a cam mechanism operatively connecting the first moving member and a second moving member; and the second moving member which moves the flashtube by being moved in association with the first moving member by the cam mechanism when the first moving member moves within a second moving range beyond the first moving range.

4. The camera as defined in claim 3, wherein the flash assembly is forced toward the active position by a forcing device.

5. A camera, comprising:

a camera body;

a flash assembly which is movable between an inactive position where the flash assembly is stored in the camera body and an active position where the flash assembly is protruded from the camera body;

a flashtube arranged in the flash assembly movably forward and backward to change an illumination angle;

a cam member arranged in the camera body movably in a predetermined direction, the cam member having a first cam face for moving the flash assembly and a second cam face for moving the flashtube;

a cam moving member which moves the cam member in the predetermined direction;

a flash assembly moving member having a first cam follower to contact with the first cam face of the cam member and a force transmitting member to transmit a force to the flash assembly, the flash assembly moving member moving the flash assembly through the force transmitting member when the cam member is moved in a first moving range and the first cam follower is moved in association with the cam member while being guided by the first cam face; and a flashtube moving member having a second cam follower to contact with the second cam face of the cam member, the flashtube moving member operatively connecting with the flashtube, the second cam follower being supported movably forward and backward by a supporting member, the flashtube moving member moving the flashtube when the cam member is moved within a second moving range beyond the first moving range and the second cam follower is moved in association with the cam member while being guided by the second cam face and the supporting member.

6. The camera as defined in claim 5, wherein:

the cam member and the cam moving member are connected to each other through a spring member;

the force of the cam moving member to move the cam member is transmitted to the cam member through the spring member; and the spring member absorbs an external force applied to the cam member.

7. The camera as defined in claim 5, wherein the flash assembly moving member is a magnifying lever that magnifies a movement of the cam member and transmits the magnified movement to the flash assembly.

8. The camera as defined in claim 5, wherein the flash assembly is forced toward the active position by a forcing device.

* * * * *

UNITED STATES PATENT AND TRADEMARK OFFICE
CERTIFICATE OF CORRECTION

PATENT NO. : 6,314,244 B1
DATED : November 6, 2001
INVENTOR(S) : Manabe et al.

It is certified that error appears in the above-identified patent and that said Letters Patent is hereby corrected as shown below:

<u>Title page,</u>
Item [73], "Assignee", should be as follows:
-- Fuji Photo Optical Co., Ltd. --.

Signed and Sealed this

Ninth Day of July, 2002

Attest:

Attesting Officer

JAMES E. ROGAN
*Director of the United States Patent and Trademark Office*